Oct. 14, 1930.   W. H. CLARK   1,778,584
RUMBLE SEAT TOP
Filed May 26, 1928   2 Sheets-Sheet 2
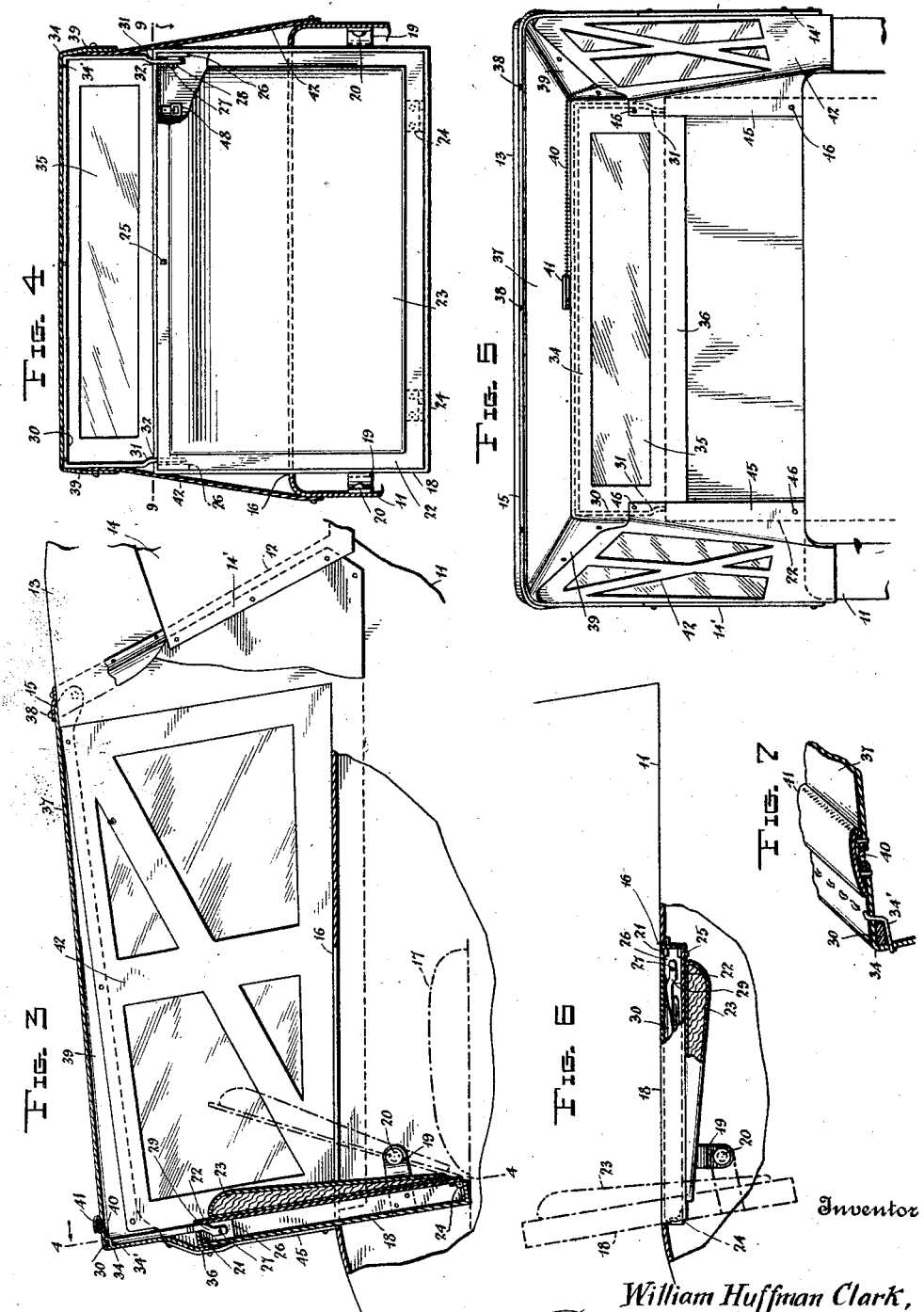
Inventor
William Huffman Clark,
By
Attorney Patented Oct. 14, 1930

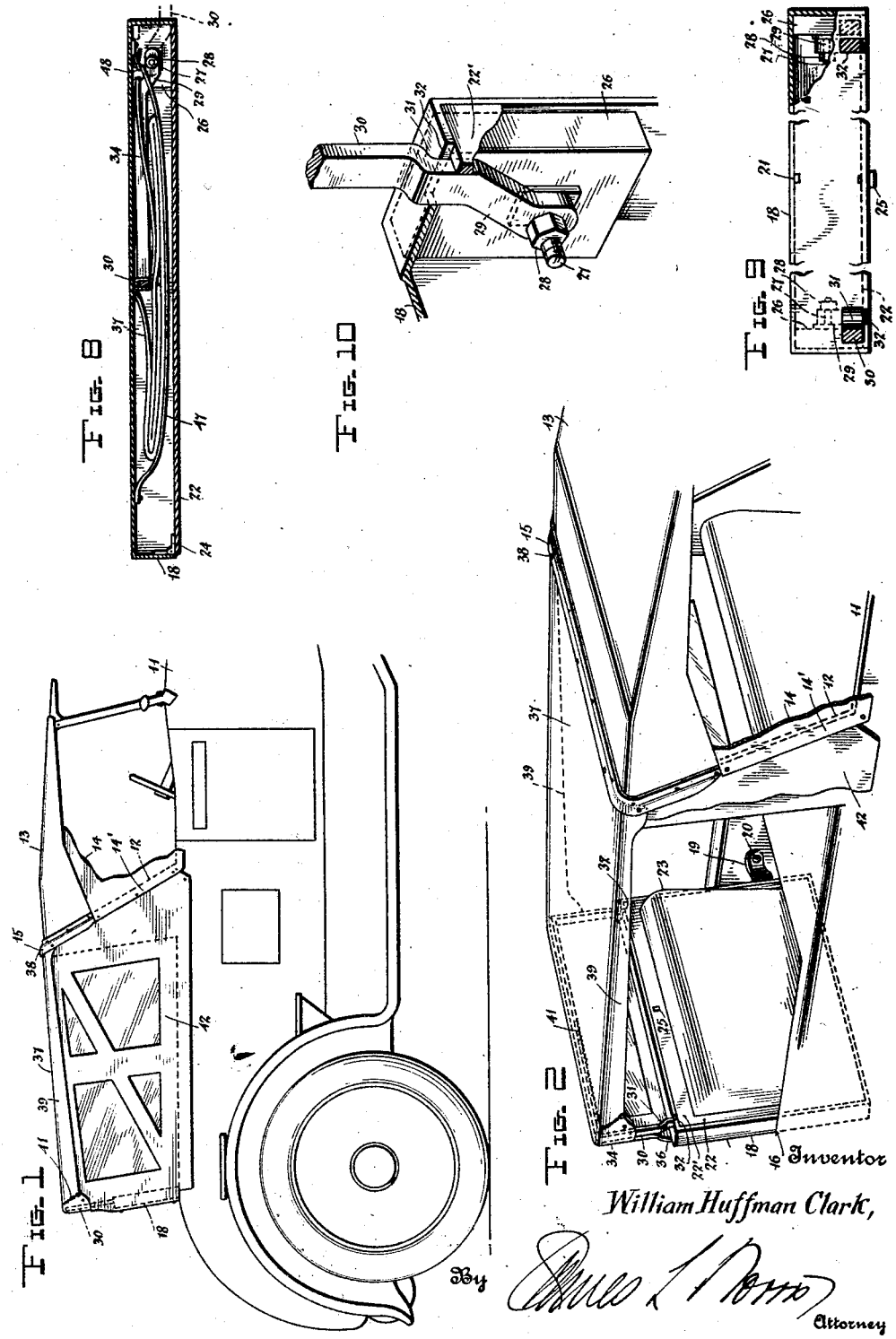

1,778,584

UNITED STATES PATENT OFFICE

WILLIAM HUFFMAN CLARK, OF BALTIMORE, MARYLAND

RUMBLE-SEAT TOP

Application filed May 26, 1928. Serial No. 280,898.

This invention relates to improvements in rumble seat tops, one object of the invention being the provision of a top and side curtain for the rumble seat of an automobile which may be easily and quickly put into position or stored away when not in use.

Another object of this invention is the provision of a rumble seat back which constitutes the closure for the rumble seat recess when the rumble seat is not in use and also forms a receptacle into which the top and side curtains for the rumble seat and a rear support for the top and side curtains may be folded when the top and side curtains are not in use.

A still further object of this invention is the provision of a device of this character which may be applied to various types of motorcars, which is simple and inexpensive in construction, neat in appearance, and thoroughly efficient and practical in use.

In the accompanying drawings:—

Figure 1 is a side elevation of the rear portion of a roadster embodying the present invention;

Figure 2 is a diagrammatic perspective view of the upper portion of the same, one side curtain being shown as broken away and the top of the present invention being shown as in its extended relation to the main top of the roadster;

Figure 3 is a vertical sectional view of the rumble seat portion of a vehicle having my invention applied thereto and showing the top extended and the off-side curtain in position, a portion of the main top being illustrated;

Figure 4 is a section taken on line 4—4 of Figure 3;

Figure 5 is a rear view of the upper portion of a roadster with the present rumble seat top and side curtains in use;

Figure 6 is a sectional view through the adjacent portion of the rumble seat recess showing the seat back in closure-forming position, dotted lines showing in back in raised position;

Figure 7 is a fragmentary view of the rear portion of the top and showing the multiple hookless fastening device for the opening in the top to permit easy egress and ingress when the top is in use and at the same time to render the joint waterproof;

Figure 8 is a vertical sectional view of the seat back casing showing the top and side curtains and the support for same positioned therein in the position they assume when the top is not in use;

Figure 9 is a section taken on line 9—9 of Figure 4; and

Figure 10 is a perspective view, partly in section, showing the method of attaching the rear top support to the casing of the rumble seat back.

Referring to the drawings, the numeral 11 designates the body of a roadster, although the same may be of the coupe type, in which the top is rigid. The rear bow 12 carries the top 13 for the main portion of the roadster and the side curtains 14 are each provided with an exterior engaging flap 14', while extended across the upper portion of the bow 12 is a flap 15, the purpose of which will presently appear.

An opening 16 is formed in the rear deck of the body over a compartment in which a rumble seat 17 is mounted. The opening 16 extends substantially the full width of the rear portion of the body and a casing 18 is hinged between the sides of the body below said opening and above the rear portion of the seat 17 so that it may be swung to a substantially upright position, as shown in full lines in Figures 2 and 3 and in broken lines in Figure 6, to serve as a back for the seat 17, or may be swung to a substantially horizontal position, as shown in full lines in Figure 6, to serve as a closure for the opening 16.

That face of the casing 18 which, when the casing is in the position shown in full lines in Figures 2 and 3 to serve as the back of the seat 17, will hereinafter be termed the front thereof; and that longitudinal edge of the casing which, when the casing is in the position just mentioned, lies adjacent the rear edge of the seat 17 will hereinafter be termed the lower edge thereof.

The means for hingedly mounting the casing 18 in the body is shown as consisting of a pair of flat members or arms 19, each carried by an end of the casing 18 adjacent the lower edge of the latter and having an opening adjacent its free end, and pins 20 projecting, respectively, toward one another from the inner surface of one of the side walls of the body and through the openings of the members or bars 19. The distance of the pins 19 above the rear edge of the seat 17 is substantially the same as the distance between the openings in the arms 19 and the lower edge of the casing 18.

The casing 18 carries a lock or catch 21 at its upper edge which, when the casing is in position to close the opening 17, cooperates with the forward edge of the opening 16 to secure the casing in such position.

The casing 18 is open at its front to form a receptacle for the top and side curtains and the supporting means for said top to be hereinafter described. A closure 22, coextensive with the opening in the front of the casing 18, is hinged at its lower edge to the lower edge of said casing and is upholstered on its front face, as at 23, to form a back cushion for the seat 17.

A catch 25 is carried by the inner face of the closure 22 adjacent the upper edge of the latter and engages the upper edge of the opening in the casing 18 to secure the closure 22 over said opening.

Mounted within the casing, at its upper corners are blocks 26, preferably of metal, each having a threaded stud 27 projecting laterally therefrom through an aperture in one terminal portion 29 of a substantially U-shaped frame 30. The studs 27 thus form pivots on which the U-shaped frame may swing into or out of the casing, as will presently appear, and nuts 28 on the threaded portions of said studs secure the terminal portions 29 of said frame against removal from said studs. In order to give the proper width to the U-shaped member 30, the terminal portions 29 thereof are bent toward one another and then substantially parallel to the side members of said frame as at 31 and, when the frame 30 is moved out of the casing 18 into raised position, the terminal portions 29 thereof are seated in notches 32 in the upper wall of said casing, as shown in Figure 10. A pair of lugs or projections 22′ are mounted on the inner side of the closure 22 adjacent its upper edge and spaced, respectively, a sufficient distance from its end edges to overlie the terminal portions 29 of the frame 30 when the latter is in raised position so as to brace said terminals transversely of the body of the vehicle and secure them against displacement from the notches or recesses 32 of the casing 18.

The rear portion 34 of the top for the rumble seat is attached to the transverse member of the frame 30 by means of lacings or threads 34′, as illustrated in Figure 7, the top having a rear curtain depending from its rear edge which is provided with an opening 35. The lower edge of the rear curtain forms a flap 36 adapted to extend, as shown in Figures 1 and 2, over the rear edge of the casing 18, so that moisture or rain is directed away therefrom and will not enter the recess of the seat.

The main portion 37 of the top is extended forwardly of the frame and is attached by means of the fastenings 38 beneath the flap 15 carried by the top 13 for the front seat, said flap extending over the joint and preventing the entry of air or water.

The side edges of the rumble seat top extend downwardly and form flaps for the upper edges of the side curtains 42, while in order to permit easy egress and ingress beneath the top for the rumble seat said top, as shown in Figures 5 and 7, has a slit extending partially across the same from its right hand edge adjacent the frame 30 covered by a flap 41 to exclude the weather therefrom when the members of the multiple hookless fastener carried by the opposite edges of said slit are closed. This multiple hookless fastener is operable from the inside so that the portion released thereupon can be moved upwardly to permit the passenger to enter or alight.

The forward edges of the side curtains for the rumble seat are adapted to be attached to the bow 12 beneath the flap 14′ of the side curtains for the main seat and also under the lower edge of the flap 15, as illustrated in Figure 1, while the rear flaps 45 of the side curtains for the rumble seat are extended and attached to the fastenings 46 carried by the frame 30 and also to the back of the seat, all flap connections being disposed so as to overlap toward the rear of the car and thus shield the enclosure from the admission of wind and rain. When the top for the rumble seat and the support for same are not in use the side curtains 42 may be used to serve as a windshield.

When the top for the rumble seat is not to be used the catch 25 of the closure 22 of the casing 18 is released and said closure is swung forwardly into the position shown in broken lines in Figure 3. The forward edge of the rumble seat top is then detached from the rear edge of the top 13 and folded. The frame 30 is then swung forwardly and downwardly into the casing 18 and secured in place by a strap 47 of which one end is secured to the rear wall of the casing adjacent its lower end and the other end is engageable by a buckle 48 carried by said back wall adjacent its upper end.

From the foregoing description, taken in connection with the drawings, it is evident that by means of a top and side curtain structure as here illustrated, coupés and roadsters of various types and makes may be provided with waterproof top and side curtains which may be readily placed in position and as easily stored, as the casing 18, as shown, provides a receptacle therefor and the strap 47 and buckle 48, as shown in Figure 8, will hold the top and side curtains properly housed.

What is claimed is:—

1. A seat back comprising a casing including a rear wall, a top wall and end walls together forming an open-fronted recess, said top wall having adjacent each of its ends a slot extending transversely of a portion of its width from its forward edge, a substantially U-shaped frame having its ends pivoted to swing on a fixed horizontal axis between the end walls of said back to swing out of said recess to seat its side members in said slots or to swing into said recess substantially parallel with the rear wall of the latter, a lid for said recess hinged at its lower edge to the lower portion of said casing, and a flexible top carried by said U-shaped frame and extensible forwardly therefrom, said top being foldable upon said frame and movable into and out of said recess with the latter.

2. A seat back comprising a casing including a back wall, a pair of end walls and a top wall forming an open-fronted recess, said top wall having adjacent each of its ends a slot extending transversely of a part of its width from its forward edge, a substantially U-shaped frame having its end portions extending between and pivotally connected to the side walls of said casing to swing out of said receptacle into a position above the upper wall of said casing with its side members in said slots or to swing into said casing, said U-shaped frame having means adjacent each of its ends engageable with the top wall of said casing when said frame is swung above the top wall of said casing to limit the rearward movement of said frame, a cover for said recess hinged to said casing at the lower portion of said recess and resting against the end portions of said frame when said frame is swung above said casing to hold said end portions in said slots, and a flexible top having its rear end connected to said U-shaped frame, said flexible top being foldable upon said U-shaped frame and adapted to swing with the latter into said recess.

3. A seat back according to claim 2 wherein a pair of lugs are mounted on the inner face of the cover, one adjacent each end of the latter, to bear, respectively, against the inner sides of the ends of the U-shaped frame when the latter is swung above the top wall of the casing and brace said ends against lateral movement.

4. A seat back according to claim 2 wherein the flexible top carried by the U-shaped frame has a slit extending from one of its side edges adjacent said frame to a point approximately midway between its side edges and complemental fastening devices are carried by the opposite edges of said slit for securing said edges together.

5. The combination with an automobile having a rumble seat recess and a main top, of a hollow casing mounted in said recess to swing into position to cover the opening to said recess or into position to serve as the back of a rumble seat, said casing having an opening in its front side and a slot in its top wall adjacent each of its ends, a lid for said opening hinged at its lower edge to the lower portion of said casing, a lug carried by the inner side of each of the end walls of said casing, a substantially U-shaped frame of which the side members each has a shoulder adjacent its free end and each has an aperture between such shoulder and its free end, a pair of studs projecting, respectively, from the inner sides of said lugs and extending through the apertures in the side members of said frame, said frame being of such length as to swing into said casing or above the top wall of said casing with its side members seated in said slots and its shoulders resting on the upper sides of said lugs, and a top having at its forward edge means for connecting it to the main top and its rear end connected to said U-shaped frame.

In testimony whereof I have hereunto set my hand.

WILLIAM HUFFMAN CLARK.